(12) United States Patent
Malkamäki

(10) Patent No.: US 7,894,443 B2
(45) Date of Patent: Feb. 22, 2011

(54) RADIO LINK CONTROL UNACKNOWLEDGED MODE HEADER OPTIMIZATION

(75) Inventor: Esa Malkamäki, Espoo (FI)

(73) Assignee: Nokia Corporation, Espoo (FI)

( * ) Notice: Subject to any disclaimer, the term of this patent is extended or adjusted under 35 U.S.C. 154(b) by 856 days.

(21) Appl. No.: 11/508,186

(22) Filed: Aug. 23, 2006

(65) Prior Publication Data

US 2007/0047582 A1 Mar. 1, 2007

Related U.S. Application Data

(60) Provisional application No. 60/710,193, filed on Aug. 23, 2005.

(51) Int. Cl.
 *H04L 12/56* (2006.01)
 *H04J 3/16* (2006.01)
(52) U.S. Cl. ........................ 370/394; 370/469
(58) Field of Classification Search .......... 370/229, 370/310, 338, 346, 394, 395.2, 449, 469; 455/436
See application file for complete search history.

(56) References Cited

U.S. PATENT DOCUMENTS

| | | | | |
|---|---|---|---|---|
| 6,956,870 | B1 * | 10/2005 | Charriere et al. | 370/470 |
| 6,961,349 | B2 * | 11/2005 | Malomsoky et al. | 370/469 |
| 7,295,573 | B2 * | 11/2007 | Yi et al. | 370/469 |
| 7,299,403 | B1 * | 11/2007 | Cleasby et al. | 715/738 |
| 2002/0024972 | A1 * | 2/2002 | Yi et al. | 370/470 |
| 2002/0196760 | A1 * | 12/2002 | Malomsoky et al. | 370/338 |
| 2003/0126139 | A1 * | 7/2003 | Lee et al. | 707/100 |
| 2003/0189900 | A1 * | 10/2003 | Barany et al. | 370/229 |
| 2005/0147040 | A1 * | 7/2005 | Vayanos et al. | 370/235 |
| 2005/0213605 | A1 | 9/2005 | Kim et al. | |
| 2007/0230476 | A1 * | 10/2007 | Ding | 370/394 |
| 2008/0144598 | A1 * | 6/2008 | Jiang | 370/346 |
| 2008/0205372 | A1 * | 8/2008 | Jiang | 370/346 |
| 2008/0285567 | A1 * | 11/2008 | Guo | 370/395.1 |

FOREIGN PATENT DOCUMENTS

| | | |
|---|---|---|
| CN | 1866971 A | 11/2006 |
| EP | 1724977 | 11/2006 |
| WO | WO 00/21253 | 4/2000 |
| WO | WO 2005/022814 | 3/2005 |

OTHER PUBLICATIONS

International Search Report for International Application No. PCT/IB2006/002292, filed Aug. 22, 2006.
3GPP TS 25.322 V6.4.0 (Jun. 2000),3rd Generation Partnership Project; Technical Specification Group Radio Access Network; Radio Link Control protocol specification, pp. 1-84, Jun. 2005.
Chinese Office Action, Chinese Patent Application No. 200680038765.8, Date of Notification: Sep. 14, 2010, pp. 1-4, English Translation: pp. 1-4.

* cited by examiner

*Primary Examiner*—Diane Mizrahi
(74) *Attorney, Agent, or Firm*—Squire, Sanders & Dempsey (US) LLP

(57) ABSTRACT

A system and method is provided for inserting, in a radio link control entity, at least one service data unit to a protocol data unit of an appropriate size. The method also includes providing at least one indicator including a length indicator for indicating that a first data octet of the protocol data unit is a first octet of a first service data unit and at least one other octet of the protocol data unit is the last octet of another service data unit, the first service data unit being either the same or different from the other service data unit.

31 Claims, 15 Drawing Sheets

Col. A:
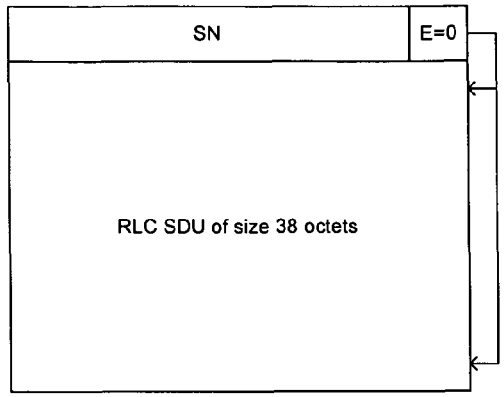
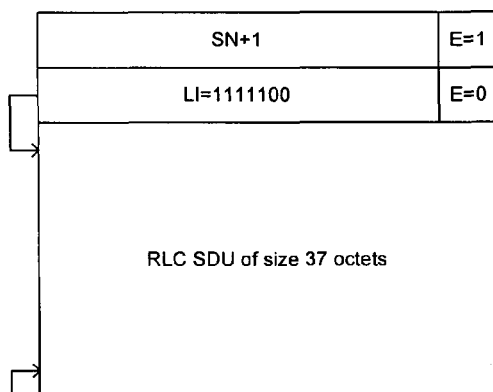
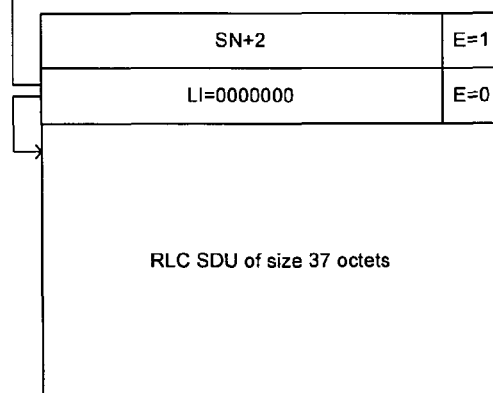
Col. B:
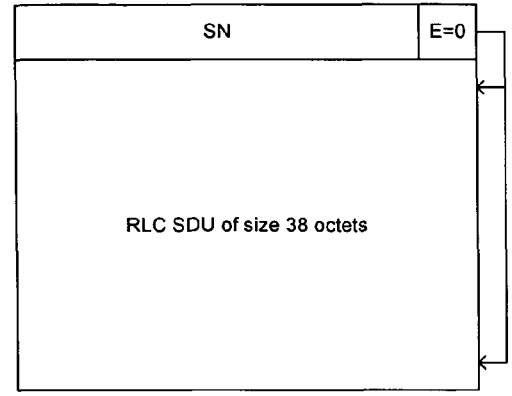
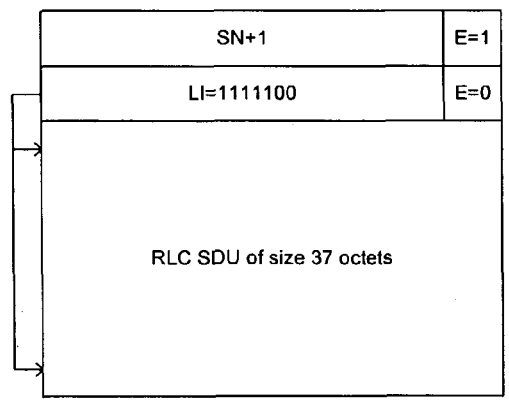
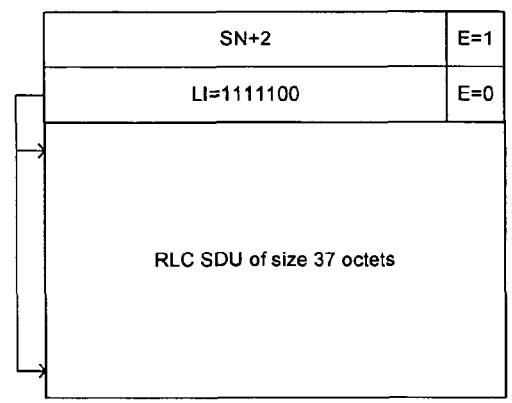
Figure 1 Sequence of RLC UMD PDUs showing the usage of LI, RLC PDU size of 39 octets and RLC SDU sizes of 38 or 37 octets

| RLC SDU size | Number of SDUs | Percentage | | |
|---|---|---|---|---|
| 97 | 2 | 0.02 % | | |
| 95 | 1 | 0.01 % | | |
| 40 | 1 | 0.01 % | | |
| 39 | 340 | 2.93 % | | |
| 38 | 502 | 4.32 % | | |
| 37 | 127 | 1.09 % | | |
| 36 | 286 | 2.46 % | | |
| 35 | 8847 | 76.18 % | | |
| 14 | 433 | 3.73 % | | |
| 13 | 463 | 3.99 % | | |
| 12 | 53 | 0.46 % | | |
| 11 | 39 | 0.34 % | | |
| 10 | 520 | 4.48 % | | |

Figure 1-a RLC SDU distribution for 12.2 kbit/s AMR codec assuming minimum compressed RTP/UDP/IP header of 3 bytes.

Col. A:
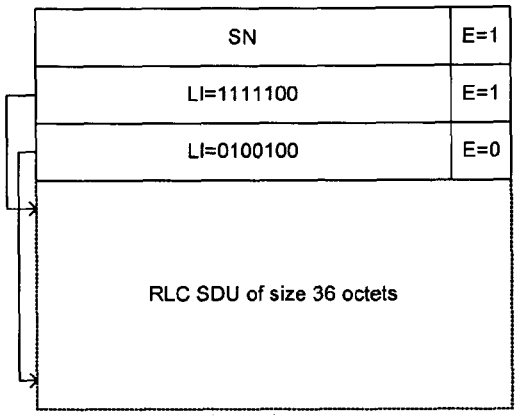
Col. B:
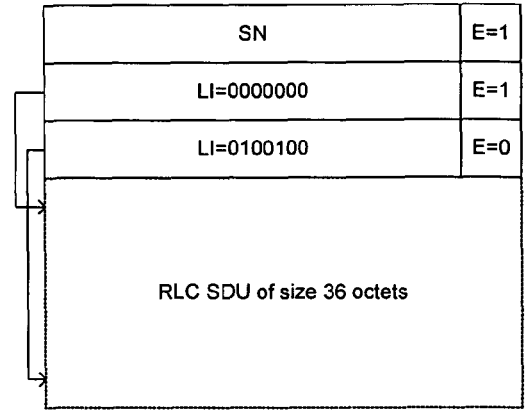
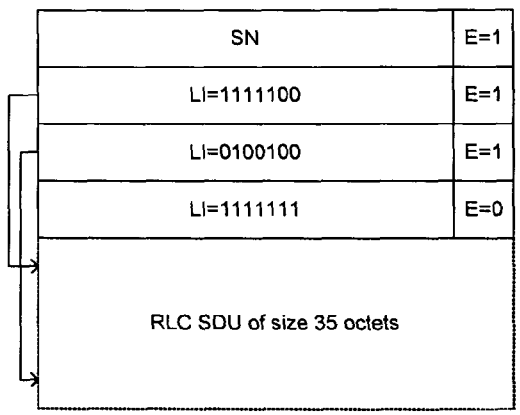
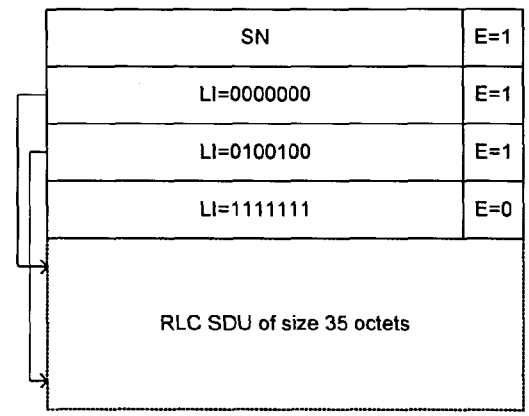
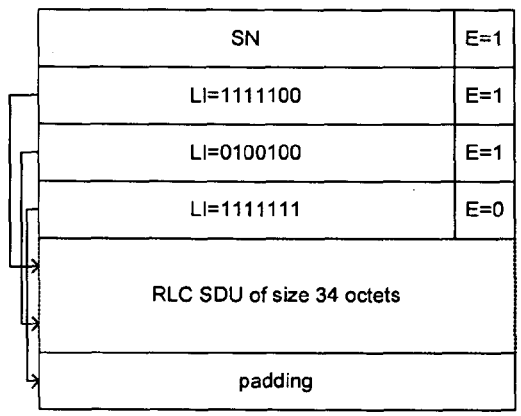
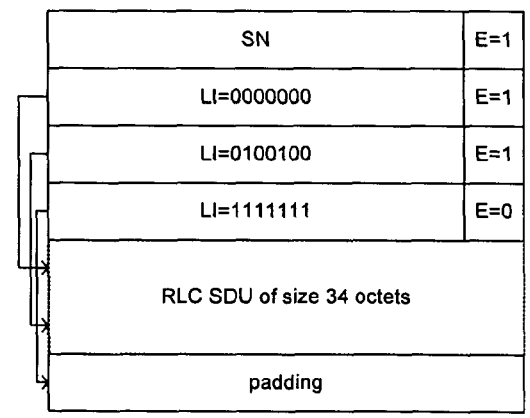
Figure 2 Sequence of RLC UMD PDUs showing the usage of LI, RLC PDU size of 39 octets and RLC SDU sizes of 36, 35 or 34 octets Col. A:
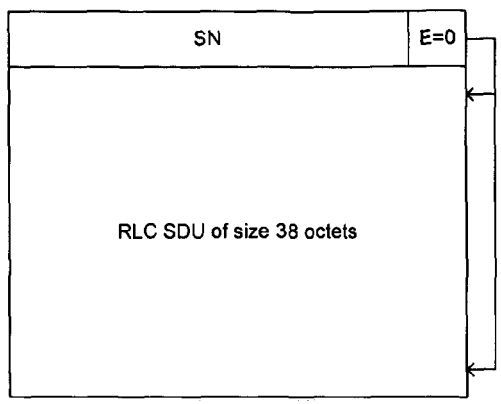
Col. B:
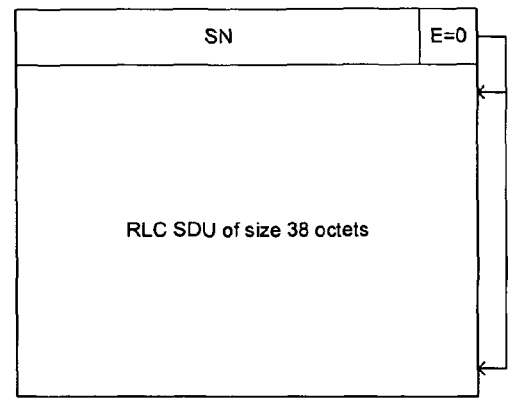
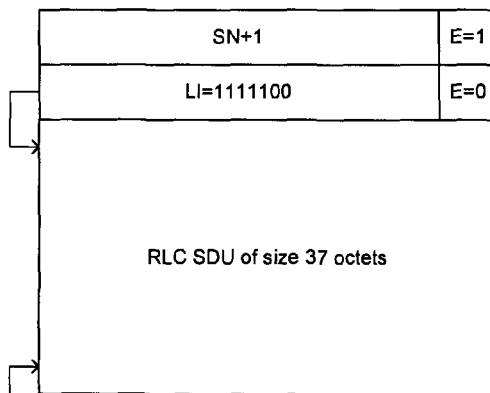
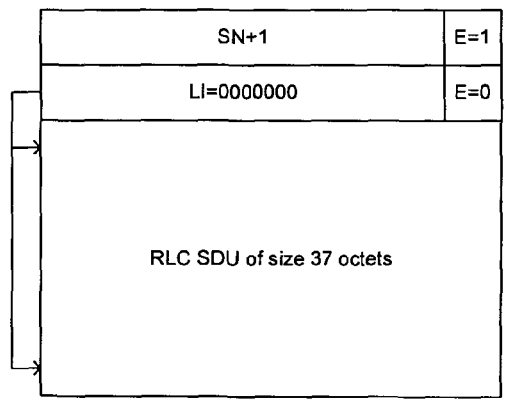
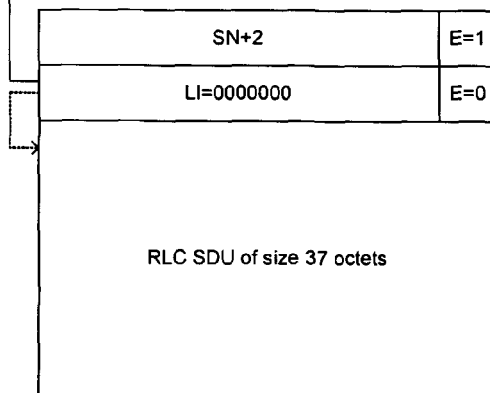
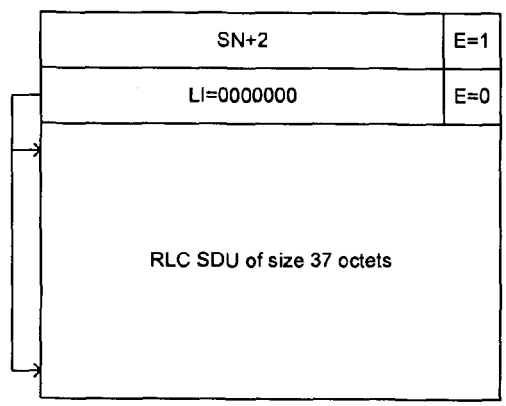
Figure 3 Sequence of RLC UMD PDUs showing the usage of LI, RLC PDU size of 39 octets and RLC SDU sizes of 38 or 37 octets Col. A:
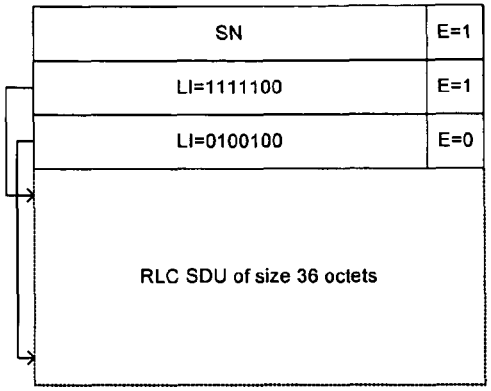
Col. B:
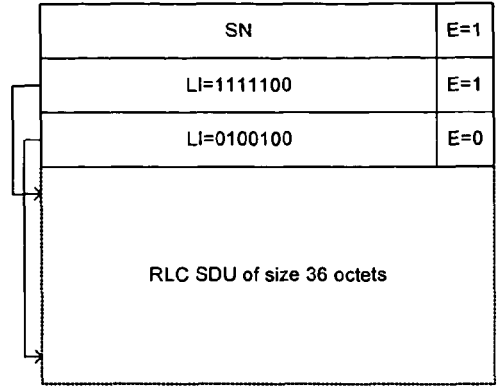
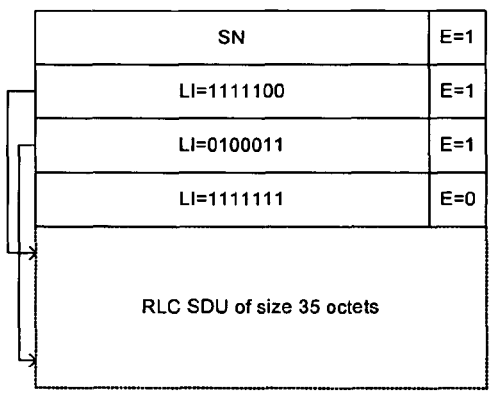
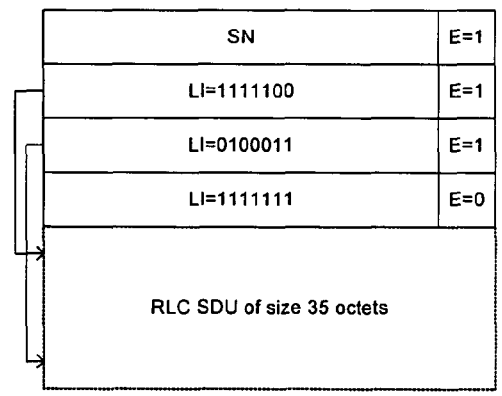
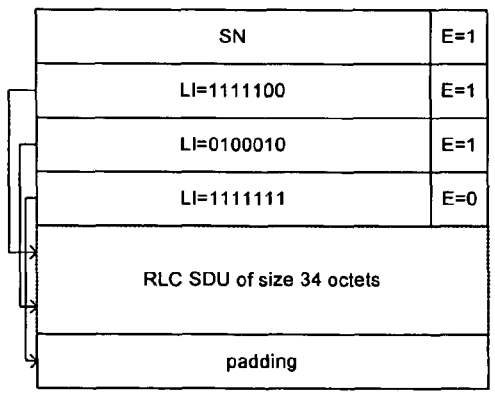
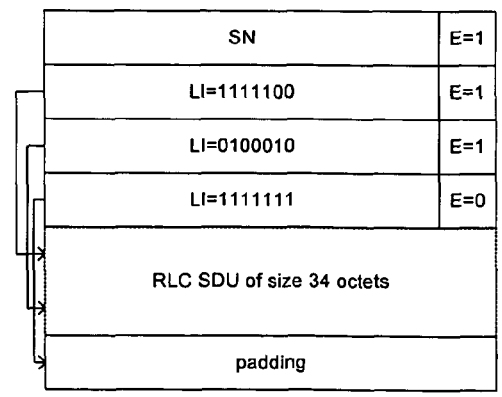
Figure 4 Sequence of RLC UMD PDUs showing the usage of LI, RLC PDU size of 39 octets and RLC SDU sizes of 36, 35 or 34 octets Col. A:
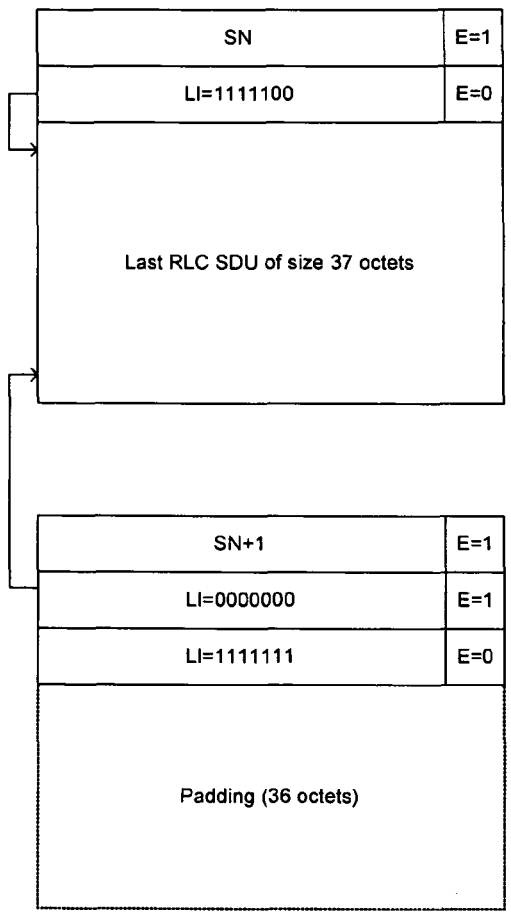
Col. B:
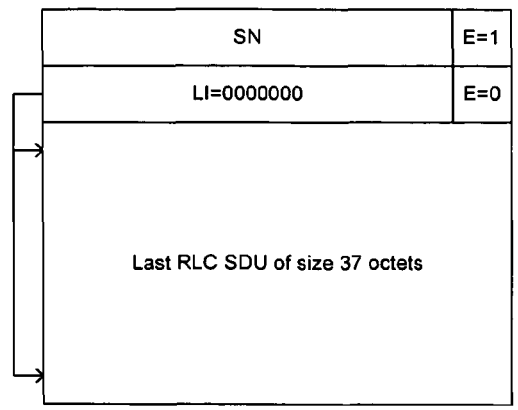
No extra PDU needed to indicate that SDU ended in the previous PDU.
Figure 5 Sequence of RLC UMD PDUs showing the usage of LI for the last SDU of 37 octets, RLC PDU size of 39 octets

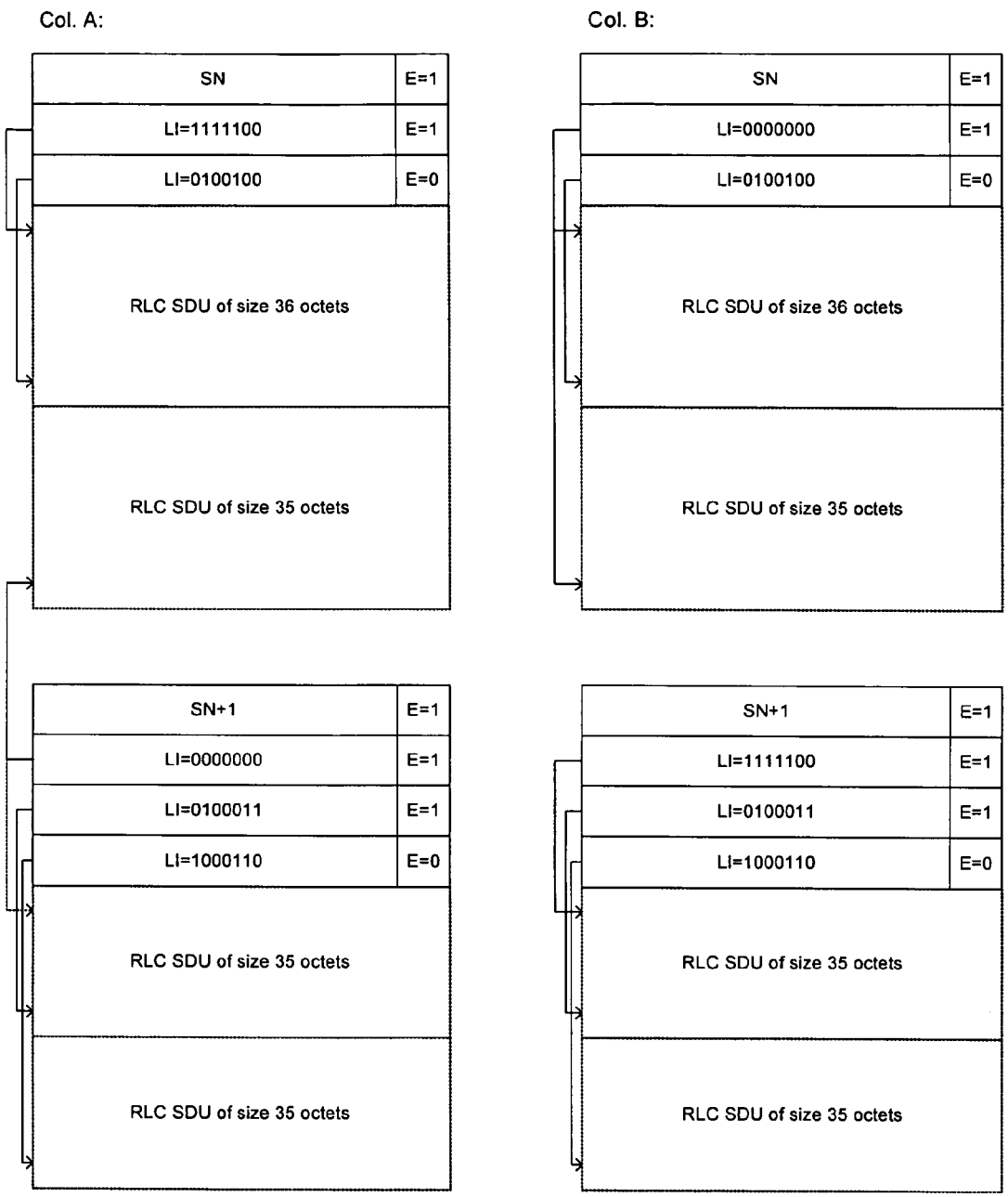
Figure 6 Sequence of RLC UMD PDUs showing the usage of LI, RLC PDU size of 74 octets and two RLC SDUs per PDU

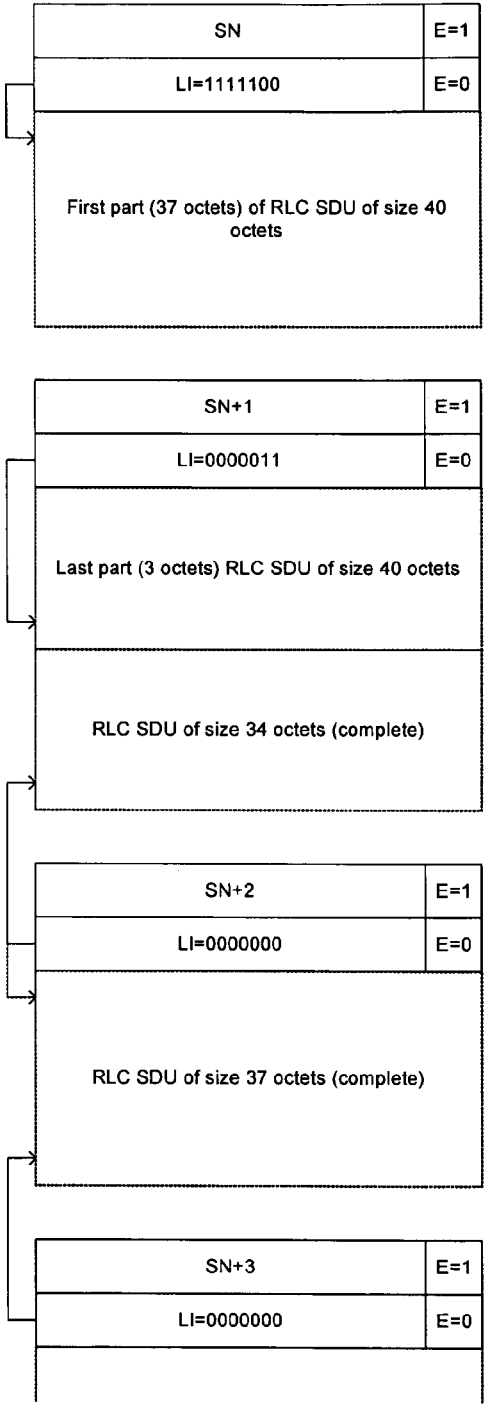
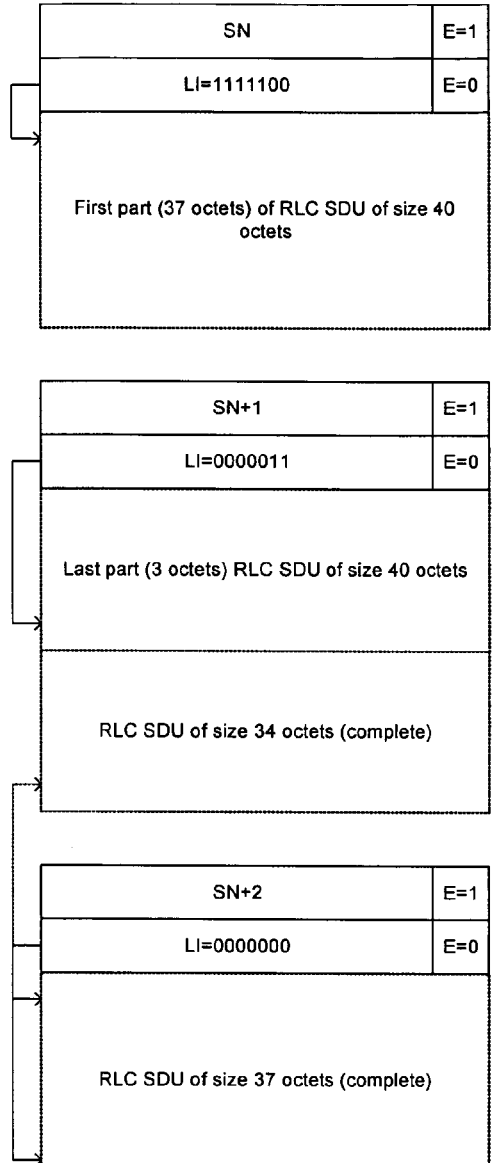
Figure 7 Sequence of RLC UMD PDUs showing the usage of LI, RLC PDU size of 39 octets and a sequence of RLC SDU sizes of 40, 34 and 37 octets Col. A:
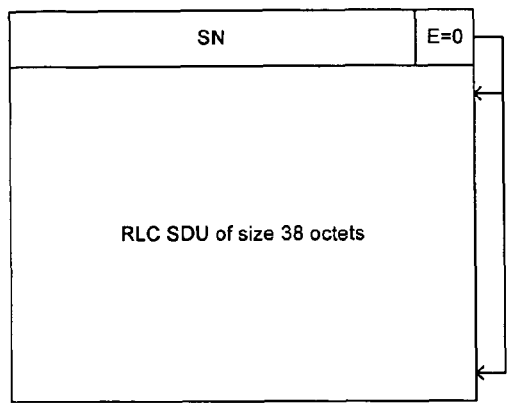
Col. B:
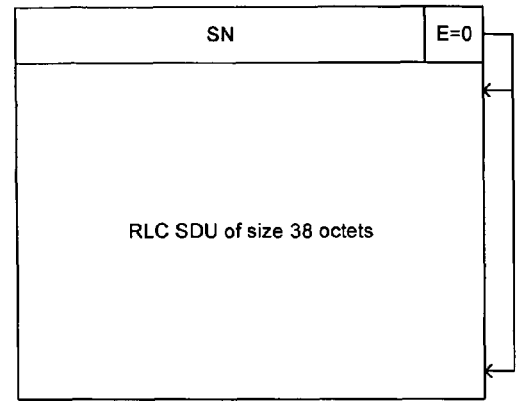
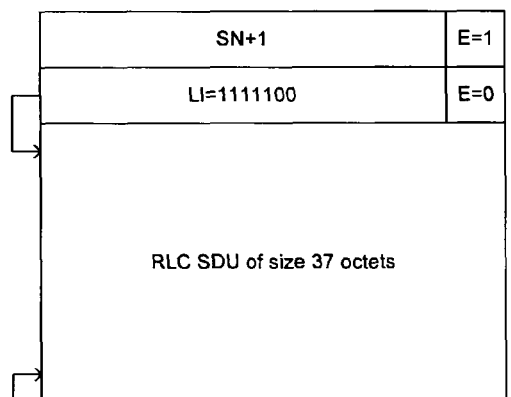
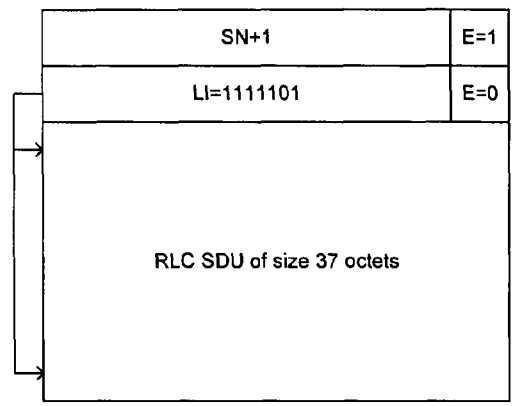
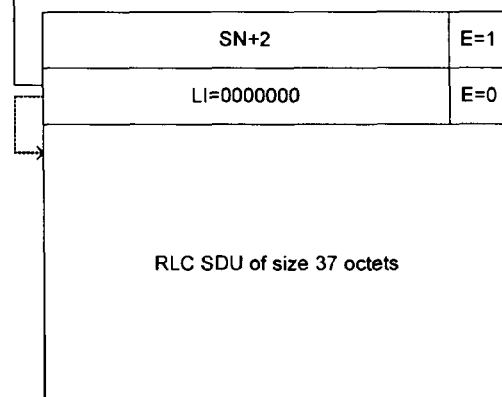
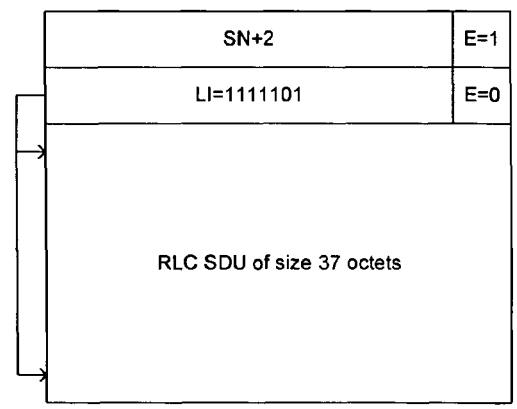
Figure 8

Col. A:
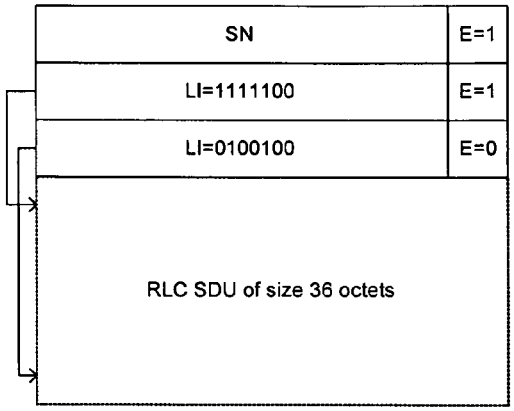
Col. B:
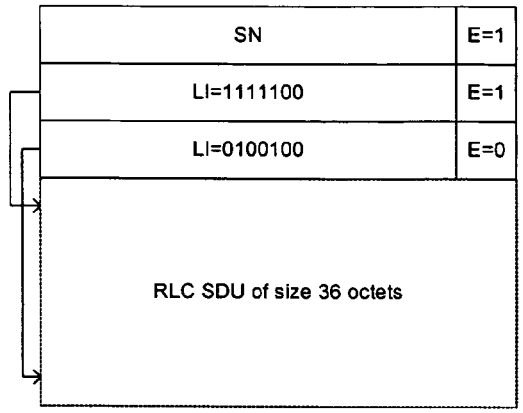
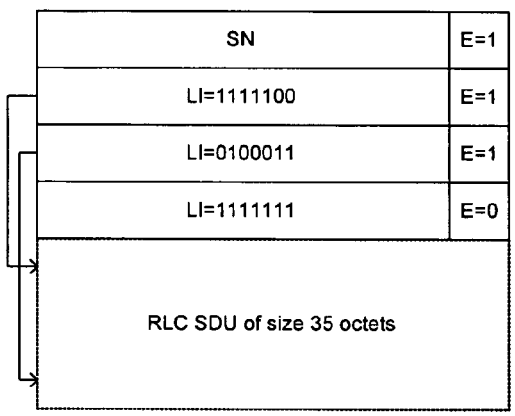
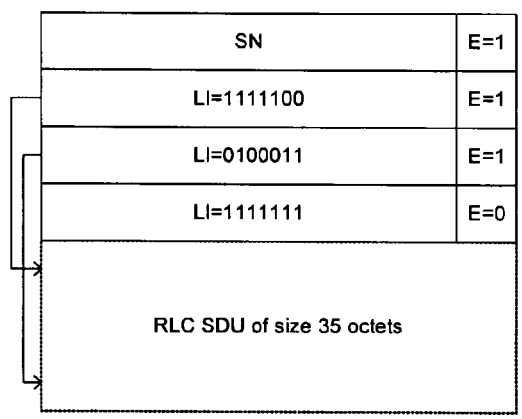
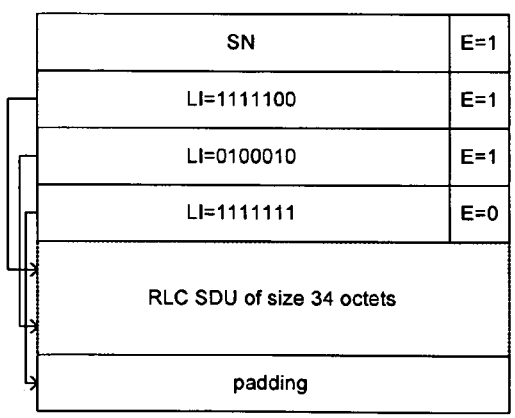
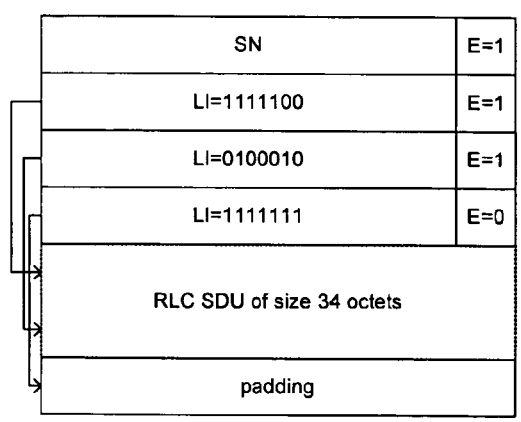
Figure 9

Last SDU in a data burst
Col. A:
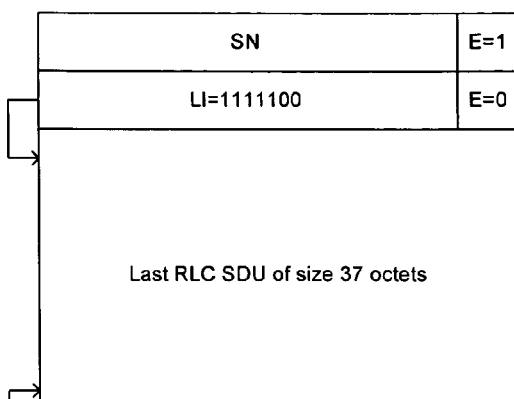
Col. B:
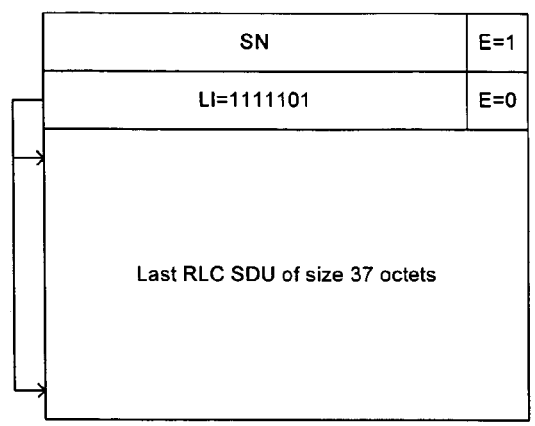
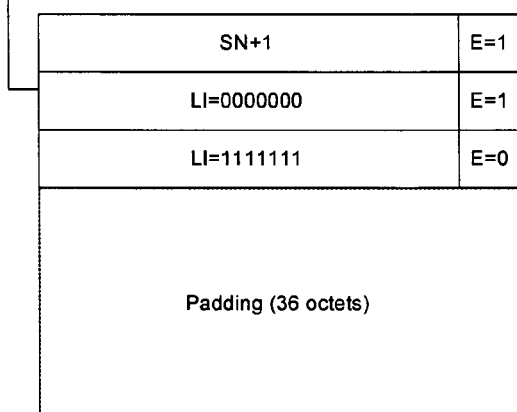
No extra PDU needed to indicate that SDU ended in the previous PDU.
Figure 10

Two complete SDUs per PDU (PDU size 74 octets):
Col. A:
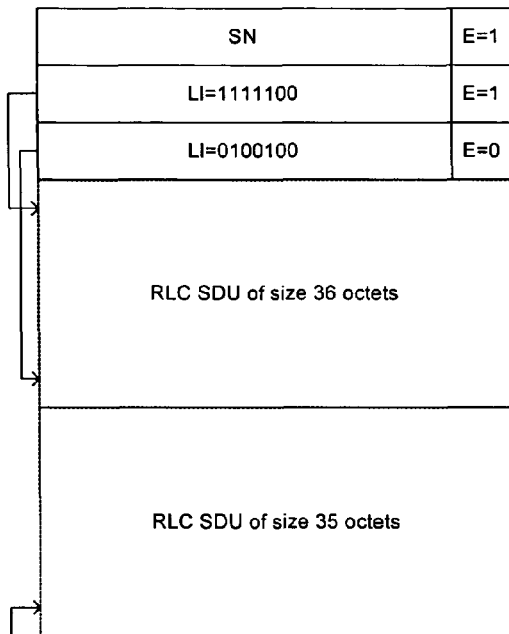
Col. B:
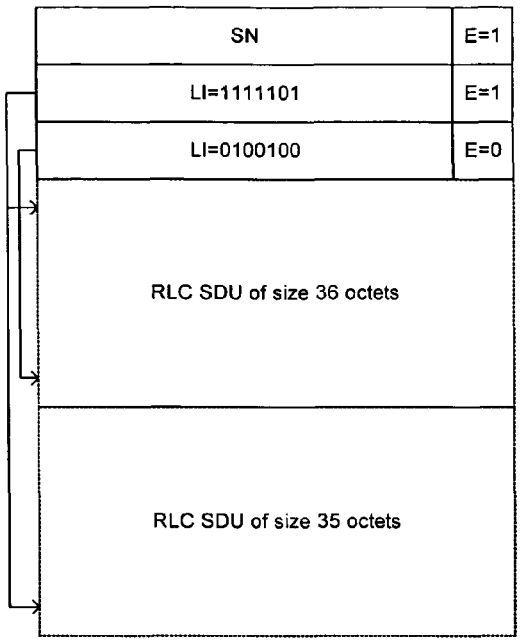
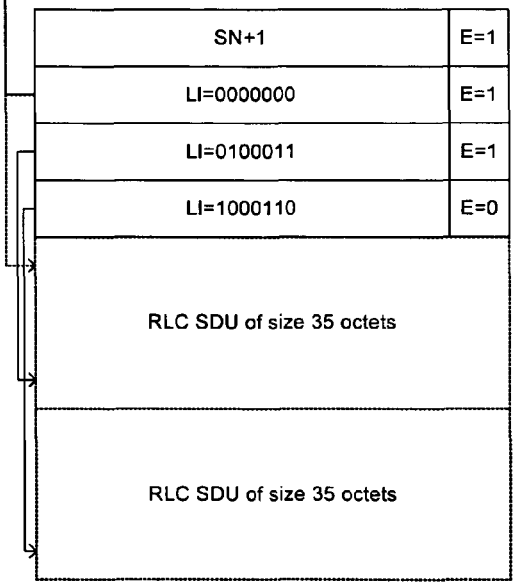
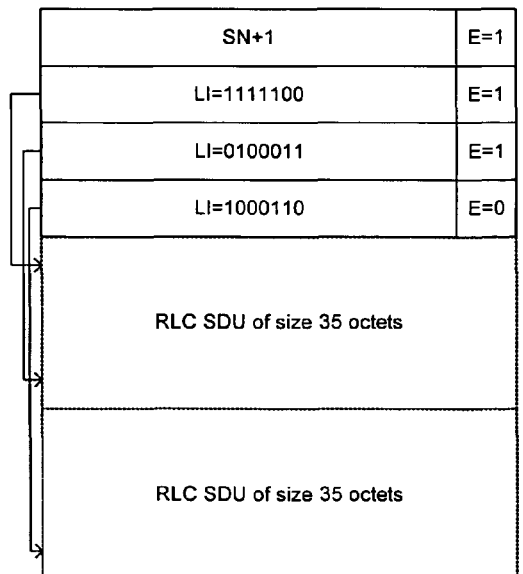
Figure 11

(PDU size 39 octets):
Col. A:
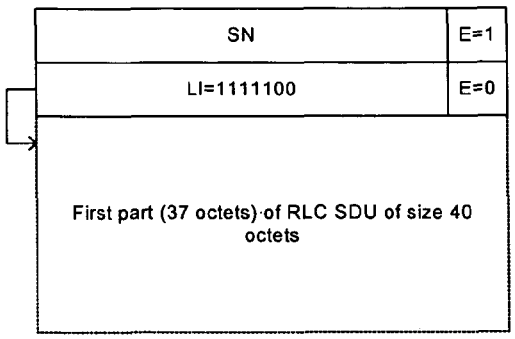
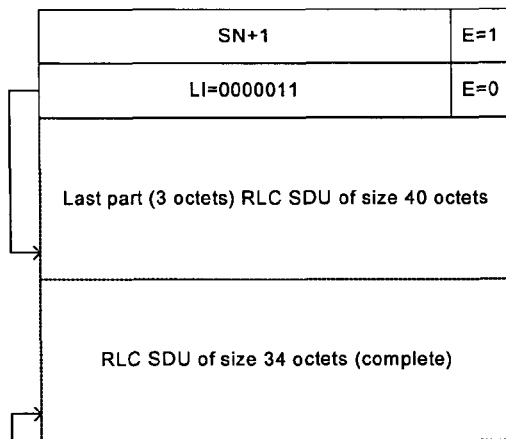
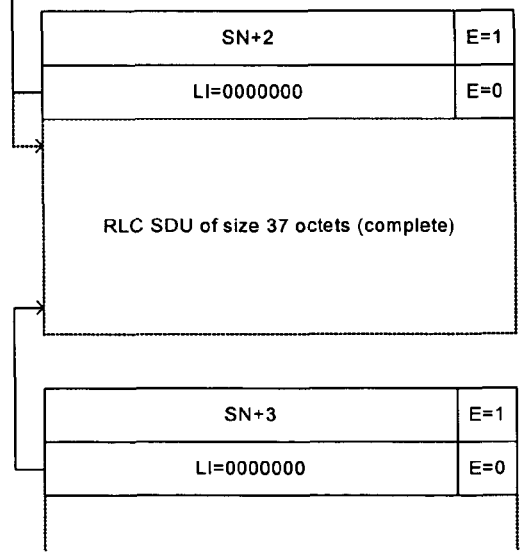
Col. B:
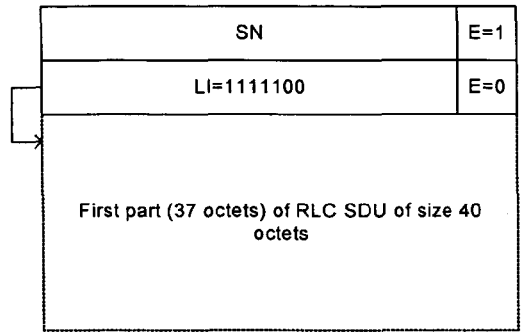
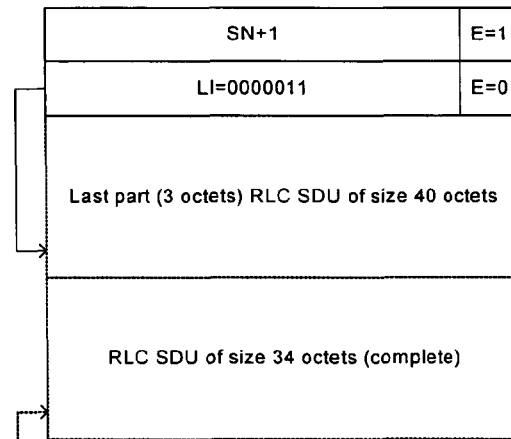
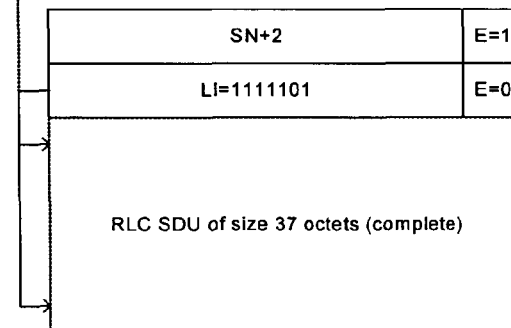
Figure 12

RADIO LINK CONTROL UNACKNOWLEDGED MODE HEADER OPTIMIZATION

CROSS-REFERENCES TO RELATED APPLICATIONS

This application claims priority of U.S. Provisional Patent Application Ser. No. 60/710,193, filed on Aug. 23, 2005. The subject matter of the above referenced application is incorporated by reference.

BACKGROUND OF THE INVENTION

1. Field of the Invention

The present invention relates to optimizing radio link control unacknowledged-mode protocol data unit headers, for example, to better support packet switched voice transmissions or transmission of other real time packet switched services over Wideband CDMA air interface.

2. Description of the Related Art

With Voice-over-IP (VoIP) there are typically several different radio link control (RLC) Service Data Unit (SDU) sizes. FIG. 1a illustrates a measured example distribution for a 12.2 kbit/s adaptive multi rate (AMR) voice codec. The voice codec itself produces equal size packets but a robust header compression (ROHC) produces variable size SDUs. In order to optimize the RLC overhead, for the example in FIG. 1a, the following RLC Protocol Data Unit (PDU) sizes could be selected: 11, 15, 36, 40 and 98 octets. RLC PDU sizes of 11 and 36 octets may be used for the most frequent RLC SDU sizes, silence indicator (SID) and speech frames, respectively. RLC PDU sizes of 15 and 40 octets may be used for several, less frequent, RLC SDU sizes. It is noted that there are quite significant amounts of RLC SDUs which are 2 octets smaller than the RLC PDU sizes, 13 and 38 octets (SDU sizes), respectively.

For a RLC SDU which is two octets smaller than the RLC PDU, the beginning of the RLC SDU is indicated with special length indicator (LI), where LI=1111100 or LI=0000000 if the previous RLC SDU was also two octets smaller than the RLC PDU. Therefore, there is no room to indicate the end of the RLC SDU and that has to be indicated in the next RLC PDU with LI=0000000. As such, if the next PDU is lost, a receiver cannot be sure whether the RLC SDU was completely there or not.

SUMMARY OF THE INVENTION

An embodiment of the present invention is directed to a method including inserting, in an unacknowledged mode entity of a radio link control, at least one service data unit to a protocol data unit of an appropriate size. The method also includes providing at least one indicator for defining boundaries between the at least one service data unit within the protocol data unit, the at least one indicator including a length indicator for indicating that a first data octet of the packet data unit is a first octet of a first service data unit and at least one other octet of the packet data unit is the last octet of another service data unit, the first service data unit being either the same or different from the other service data unit.

Another embodiment of the invention is directed to an unacknowledged mode entity including a inserting unit configured to insert in a radio link control entity, at least one service data unit to a protocol data unit of an appropriate size. The entity also includes a providing unit configured to provide at least one indicator including a length indicator for indicating that a first data octet of the protocol data unit is a first octet of a first service data unit and at least one other octet of the protocol data unit is the last octet of another service data unit, the first service data unit being either the same or different from the other service data unit.

Another embodiment of the invention relates to an apparatus inserting means to insert in a radio link control entity, at least one service data unit to a protocol data unit of an appropriate size. The apparatus also includes providing means to provide at least one indicator including a length indicator for indicating that a first data octet of the protocol data unit is a first octet of a first service data unit and at least one other octet of the protocol data unit is the last octet of another service data unit, the first service data unit being either the same or different from the other service data unit.

A computer program product embodied on a computer readable medium, the computer program product comprising code portions for inserting, in a radio link control entity, at least one service data unit to a protocol data unit of an appropriate size and providing at least one indicator including a length indicator for indicating that a first data octet of the protocol data unit is a first octet of a first service data unit and at least one other octet of the protocol data unit is the last octet of another service data unit, the first service data unit being either the same or different from the other service data unit.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein:

FIG. 1a illustrates an example RLC service data unit distribution for 12.2 kbit/s AMR codec assuming minimum compressed RTP/UDP/IP header of 3 bytes;

FIG. 1 illustrates Sequence of RLC UMD PDUs showing the usage of the length indicator, RLC PDU size of 39 octets and RLC SDU sizes of 38 or 37 octets;

FIG. 2 illustrates Sequence of RLC UMD PDUs showing the usage of the length indicator, RLC PDU size of 39 octets and RLC SDU sizes of 36, 35 or 34 octets;

FIG. 3 illustrates Sequence of RLC UMD PDUs showing the usage of the length indicator, RLC PDU size of 39 octets and RLC SDU sizes of 38 or 37 octets;

FIG. 4 illustrates Sequence of RLC UMD PDUs showing the usage of the length indicator, RLC PDU size of 39 octets and RLC SDU sizes of 36, 35 or 34 octets;

FIG. 5 illustrates Sequence of RLC UMD PDUs showing the usage of the length indicator for the last SDU of 37 octets, RLC PDU size of 39 octets;

FIG. 6 illustrates Sequence of RLC UMD PDUs showing the usage of the length indicator, RLC PDU size of 74 octets and two RLC SDUs per PDU;

FIG. 7 illustrates Sequence of RLC UMD PDUs showing the usage of the length indicator, RLC PDU size of 39 octets and a sequence of RLC SDU sizes of 40, 34 and 37 octets;

FIG. 8 illustrates sequence of RLC UMD PDUs showing the usage of length indicator, RLC PDU size of 39 octets and RLC SDU sizes of 38 or 37 octets, according to third embodiment of the invention;

FIG. 9 illustrates Sequence of RLC UMD PDUs showing the usage of length indicator, RLC PDU size of 39 octets and RLC SDU sizes of 36, 35 or 34 octets;

FIG. 10 illustrates sequence of RLC UMD PDUs showing the usage of length indicator for the last SDU of 37 octets, RLC PDU size of 39 octets;

FIG. 11 illustrates sequence of RLC UMD PDUs showing the usage of length indicator, RLC PDU size of 74 octets and two RLC SDUs per PDU;

FIG. 12 illustrates sequence of RLC UMD PDUs showing the usage of length indicator, RLC PDU size of 39 octets and a sequence of RLC SDU sizes of 40, 34 and 37 octets.

DETAILED DESCRIPTION OF PREFERRED EMBODIMENTS

Reference will now be made to the preferred embodiments of the present invention, examples of which are illustrated in the accompanying drawings. The present invention relates to optimizing radio link control (RLC) unacknowledged mode (UM) protocol data unit (PDU) headers of WCDMA, for example, for Voice over IP Multimedia Services (VoIMS). Specifically, the present invention relates to optimizing RLC PDU headers to better support packet switched voice transmissions or transmissions of other real time services over WCDMA air interface. It should be noted that while the present application describes the invention as being implemented in a WCDMA type of system, the present invention may be implemented in other systems, such as in 3.9 G systems. Therefore, implementation of the invention in WCDMA systems as described in the present application is only one example. It should also be noted that the network side can be implemented in the radio network controller (RNC), as well as in Node B. RNC functions in future systems, such as 3.9 G systems may be located elsewhere, such as in a base station.

Figure 1B:
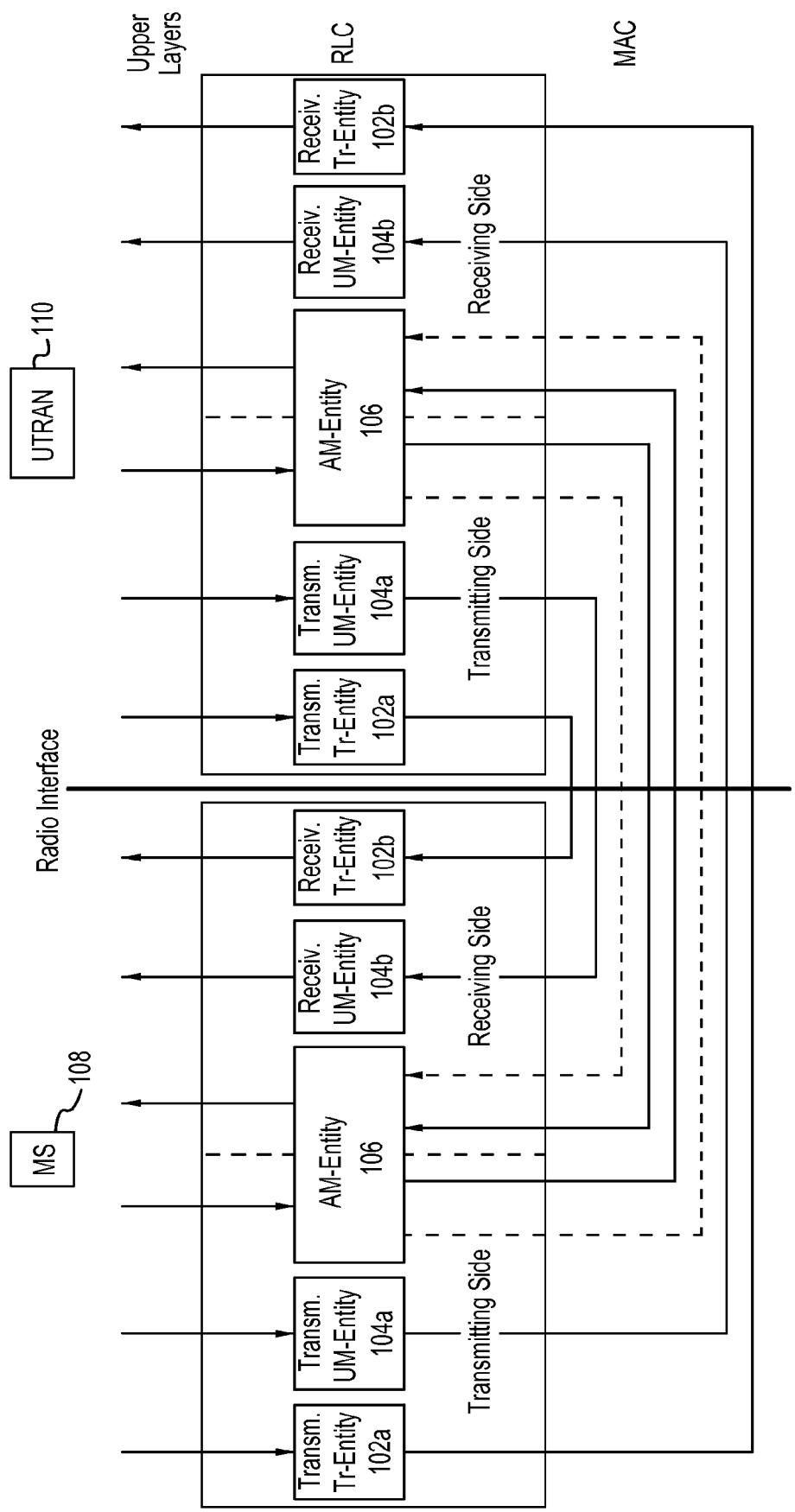
FIG. 1b illustrates the architecture of an RLC sublayer.

Radio link control (RLC) is a link layer protocol that is responsible for error recovery and flow control in UMTS 3G cellular systems. FIG. 1b illustrates the architecture of the RLC sublayer. As illustrated in FIG. 1b, the RLC sublayer includes a transparent mode (TM) entity 102, an unacknowledged mode (UM) entity 104 and an acknowledge mode (AM) entity 106. UM entity 104 and the TM entity 102 can be configured to be a transmitting RLC entity 102a/104a or a receiving RLC entity 102b/104b. The transmitting RLC entity 102a/104a transits RLC protocol data units (PDU) and the receiving RLC entity 102b/104b receives RLC PDU. AM entity 106 includes a transmitting side and a receiving side, where the transmitting side of AM entity 106 transmits RLC PDU and the receiving side of AM entity 106 receives RLC PDU.

In the UM and TM entities 104 and 102, the transmitting RLC entity 102a/104a acts as a sender and the peer RLC entity 102b/104b acts as a receiver. AM entity 106 acts either as a sender or a receiver depending on the elementary procedure defined between the sender and receiver. The sender is a transmitter of acknowledged mode data (AMD) PDU and the sender and receiver may reside at either the user equipment 108 or the UTRAN 110.

In UM entity 104, unacknowledged mode data (UMD) PDU is used to convey sequentially numbered PDUs that include RLC service data units (SDU) data. UMD PDUs are used by the RLC when it is configured for unacknowledged data transfer. The transmitting UM entity 104 receives RLC SDU from upper layers through the UM Service Access Point. The transmitting UM entity 106 segments the RLC SDU into UMD PDUs of appropriate size, if the RLC SDU is larger than the length of available space in the UMD PDU. The UMD PDU may include segmented and/or concatenated RLC SDUs and may also include padding to ensure that it is of a valid length. Length indicators are used to define boundaries between the RLC SDUs within the UMD PDU, unless an extension bit already indicates that a UMD PDU includes exactly one complete SDU. The length indicators are also used to define whether padding is included in the UMD PDU. If ciphering is configured and started, an UMD PDU is ciphered, except for the UMD PDU header, before it is submitted to the lower layer. The transmitting UM entity 104b submits UMD PDUs to a lower layer.

The receiving UM entity 104a receives UMD PDUs through configured logical channels from the lower layer. If the receiving UM entity 104a is configured for out of sequence SDU delivery, it will reassemble SDUs and transfer them to the upper layers as soon as all PDUs that include the SDU have been received, even if the earlier PDU have not yet been received. UM entity 104 stores the PDUs pending the retransmission of the missing PDU by the transmitting UM entity 104a. PDUs are removed from storage after recovery of all of its associated SDUs, or by a sequence number window or a storage timer.

The RLC PDU is a bit string. Depending on the service provided, the RLC SDU is also a bit string with any non-null length or a bit string with a multiple of 8 bits in length. The RLC SDU is included into the RLC PDU from the first bit onward. When the RLC is operating in the unacknowledged mode, the UMD PDU is used to transfer user data. The length of the data in the unacknowledged mode will be a multiple of 8 bits. The UMD PDU header includes a first octet which includes a sequence number and all other octets that include length indicators. In addition to the sequence number, the first octet of UMD PDU may also include an extension bit (E-bit) that has either a normal E-bit interpretation or the alternative E-bit interpretation, depending on higher layer configuration. The extension bit in all other octets of the UMD PDU always has the normal E-bit interpretation. The UMD PDU also includes a header extension type that indicates if the next octet is data or a length indicator and E-bit.

Unless the extension bit indicates that a UMD PDU includes a complete SDU which is not segmented, concatenated or padded, the length indicator is used to indicate the last octet of each RLC SDU ending within the PDU. If the extension bit indicates that the UMD PDU includes a complete SDU which is not segmented, concatenated or padded, no length indicators are present in this UMD PDU.

The length indicator is set to the number of octets between the end of the RLC header and up to and including the last octet of the RLC SDU segment. The length indicator is included in the PDUs to which they refer and the size of the length indicator may be either 7 bits or 15 bits. The length indicator size is determined independently for uplink and downlink. The length indicators which refer to the same PDU are not to be reordered in case of retransmission and are to be in the same order as the RLC SDUs to which they refer. For unacknowledged mode uplink, if the largest uplink UMD PDU size is 125 octets, 7-bit length indicators are to be used, otherwise, 15-bit length indicators are to be used. For unacknowledged mode downlink, the length indicator size provided in the "downlink RLC unacknowledged mode length indicator size" are to be used.

In the unacknowledged mode, between modifications of the largest UMD PDU size, the size of the length indicator is the same for all UMD PDUs. A 7-bit length indicator with the value "111 1100" or a 15-bit length indicator with the value "111 1111 1111 1100" is to be used. For example, the 7-bit length indicator with the value "111 1100" or the 15-bit length indicator with the value "111 1111 1111 1100" is to be used if the RLC SDU begins in the beginning of the RLC PDU, if the RLC PDU is transmitted in uplink, if the length indicators are not present for indicating that a RLC SDU ended exactly in the end or one octet short of the previous RLC PDU, if the extension bit does not indicate that the UMD PDU includes a complete SDU which is not segmented, concatenated or padded, if the length indicator is present for indicating that the first data octet in this RLC PDU is the first octet of an RLC SDU and the last octet of this RLC PDU is the last octet of the same RLC SDU, and if the length indicator is present for indicating that the first data octet in this RLC PDU is the first octet of an SDU and the same RLC SDU is one octet short of exactly filling the PDU. In the downlink, if the 7-bit length indicator is used, the receiver is prepared to receive a length indicator with the value "111 1100" and if the 15-bit length indicator is used, the receiver is prepared to receive the length indicator with the value "111 1111 1111 1100". The receiver follows predefined discard rules when the length indicator with value "111 1100" or "111 1111 1111 1100" is present and when it is absent.

In the case where the end of the last segment of an RLC SDU exactly ends at the end of a PDU and there is no length indicator that indicates the end of the RLC SDU, if the extension bit of the following PDU does not indicate that the UMD PDU includes a complete SDU which is not segmented, concatenated or padded, and if the length indicator of the following PDU does not indicate that the first data octet in that PDU is the first octet of the SDU and the last octet in that PDU is the last octet of the same SDU, and if also the length indicator of the following PDU does not indicated that the first data octet in that RLC PDU is the first octet of an SDU and that the same RLC SDU is one octet short of exactly filling the PDU, a 7-bit length indicator with the value "000 0000" shall be placed as the first length indicator in the following PDU or a 15-bit length indicator with the value "000 0000 0000 0000" shall be placed as the first length indicator in the following PDU.

In the case where a PDU includes a 15 bit length indicator indicating that an RLC SDU ends with one octet left in the PDU, the last octet of the PDU is padded by the sender and ignored by the receiver even though there is no length indicator indicating the existence of padding and is not to be filled with the first octet of the next RLC SDU data. In the case where 15 bit length indicators are used in the PDU and the last segment of an RLC SDU is one octet short of exactly filling the PDU and there are no length indicators that indicate the end of the RLC SDU, if a 15 bit length indicator is used for the following PDU, the length indicator with value "111 1111 1111 1011" is to be placed as the first length indicator in the following PDU. The remaining one octet in the current PDU is to be padded by the sender and ignored by the receiver though there is no length indicator indicating the existence of padding. If a 7-bit length indicator is configured for the following PDU and the RLC is configured for a unacknowledged mode and the extension bit of that PDU does not indicate that the UMD PDU includes a complete SDU which is not segmented, concatenated or padded, and the length indicator of that PDU does not indicate that the first data octet in that PDU is the first octet of an SDU and the last octet in that PDU is that last octet of the same SDU, the length indicator with the value "000 0000" is to be placed as the first length indicator in the following PDU and the sequence number is to be incremented by 2 before it is transmitted.

In unacknowledged mode and acknowledged mode RLC, if a 7 bit length indicator is used in the RLC PDU and one or more padding octets are present in the RLC PDU after the end of the last RLC SDU, the presence of the padding is indicated by including a length indicator with the value "1111111" as the last length indicator in the PDU. If a 15 bit length indicator is used in the RLC PDU and two or more padding octets are present in the RLC PDU after the end of the last RLC SDU, the presence of the padding is indicated by including a length indicator with the value "111 1111 1111 1111" as the last length indicator in the PDU. It should be noted that after the length indicator indicating the presence of padding has been included in the RLC PDU, the length of the padding may be zero.

In the case where the alternative E-bit interpretation is configured for unacknowledged mode RLC and the RLC PDU includes a segment of a SDU but neither the first octet nor last octet of this SDU, a 7-bit length indicator with the value "111 1110" may be used or a 15 bit length indicator with the value "111 1111 1111 1110" may be used.

In an embodiment of the invention, in the case where the alternative E-bit interpretation is configured for unacknowledged mode RLC and the first data octet in this RLC PDU is the first octet of an SDU and the last octet in this RLC PDU is the last octet of the same SDU, a 7-bit length indicator with the value "111 1101" may be used or a 15 bit length indicator with the value "111 1111 1111 1101" may be used. In the case where the alternative E-bit interpretation is configured for unacknowledged mode RLC and the first data octet in this RLC PDU is the first octet of an SDU and the same RLC SDU is one octet short of exactly filling the PDU, a 15 bit length indicator with the value "111 1111 1111 1010" may be used.

If a length indicator is still awaiting transmission and there is no RLC SDU available, an RLC PDU including this length indicator and the appropriate padding may be transmitted. Predefined values of the length indicator are used to indicate padding.

In an embodiment of the present invention, the receiver knows in the case where the RLC SDU size is two octets smaller than the RLC PDU size, that the RLC SDU begins and ends in this RLC PDU and can deliver the SDU to higher layers, even if the next RLC PDU is missing. This is especially important in the case of real time packet switched services, like VoIP. All the RLC SDUs that fit into one RLC PDU, that is, they do not require segmentation, can immediately be forwarded to higher layer without the need to wait for the next RLC PDU which may further be delayed for instance due to scheduling. Thus, this can reduce the delay of the RLC SDU, for example, a VoIP packet.

According to an embodiment of the invention, in the case where the RLC SDU is two octets smaller than the RLC PDU and happens to be the last SDU in a sequence, an additional PDU can be avoided. In a first embodiment of the present invention, the meaning of the special length indicator value 1111100 is changed to indicate that the RLC SDU starts and ends in this RLC PDU. The special LI value of 0000000 is used to indicate for unacknowledged mode that new SDU starts at the beginning of the PDU. The details are shown in the following tables.

| Length: 7 bits | |
|---|---|
| Bit | Description |
| 0000000 | AMD PDU: The previous RLC PDU was exactly filled with the last segment of an RLC SDU and there is no "Length Indicator" that indicates the end of the RLC SDU in the previous RLC PDU. UMD PDU: The first data octet in this RLC PDU is the first octet of an RLC SDU and the previous RLC PDU was exactly |

Length: 7 bits

| Bit | Description |
|---|---|
| | filled with the last segment of an RLC SDU if there is no "Length Indicator" that indicates the end of the RLC SDU in the previous RLC PDU. |
| 1111100 | UMD PDU: The first data octet in this RLC PDU is the first octet of an RLC SDU and the last octet in this RLC PDU is the last octet of an RLC SDU (same or different SDU).. AMD PDU: Reserved (PDUs with this coding will be discarded by this version of the protocol). |
| 1111101 | Reserved (PDUs with this coding will be discarded by this version of the protocol). |
| 1111110 | AMD PDU: The rest of the RLC PDU includes a piggybacked STATUS PDU. UMD PDU: The RLC PDU contains a segment of an SDU but neither the first octet nor the last octet of this SDU. |
| 1111111 | The rest of the RLC PDU is padding. The padding length can be zero. |

Length: 15 bits

| Bit | Description |
|---|---|
| 000000000000000 | AMD PDU: The previous RLC PDU was exactly filled with the last segment of an RLC SDU and there is no "Length indicator" that indicates the end of the RLC SDU in the previous RLC PDU. UMD PDU: The first data octet in this RLC PDU is the first octet of an RLC SDU, and the previous RLC PDU was exactly filled with the last segment of an RLC SDU if there is no "Length Indicator" that indicates the end of the RLC SDU in the previous RLC PDU. |
| 111111111111010 | UMD PDU: The first data octet in this RLC PDU is the first octet of an RLC SDU and the second last octet in this RLC PDU is the last octet of an RLC SDU (same or different SDU). The remaining one octet in the RLC PDU is ignored. |
| 111111111111011 | AMD PDU: The last segment of an RLC SDU was one octet short of exactly filling the previous RLC PDU and there is no "Length Indicator" that indicates the end of the RLC SDU in the previous RLC PDU. The remaining one octet in the previous RLC PDU is ignored. UMD PDU: The first data octet in this RLC PDU is the first octet of an RLC SDU, and the last segment of an RLC SDU was one octet short of exactly filling the previous RLC PDU if there is no "Length Indicator" that indicates the end of the RLC SDU in the previous RLC PDU. |
| 111111111111100 | UMD PDU: The first data octet in this RLC PDU is the first octet of an RLC SDU and the last octet in this RLC PDU is the last octet of an RLC SDU (same or different SDU). AMD PDU: Reserved (PDUs with this coding will be discarded by this version of the protocol). |
| 111111111111101 | Reserved (PDUs with this coding will be discarded by this version of the protocol). |
| 111111111111110 | AMD PDU: The rest of the RLC PDU includes a piggybacked STATUS PDU. UMD PDU: The RLC PDU contains a segment of an SDU but neither the first octet nor the last octet of this SDU. |
| 111111111111111 | The rest of the RLC PDU is padding. The padding length can be zero. |

According to another embodiment of the invention, the meaning of the special length indicator value 0000000 is changed to indicate that the RLC SDU starts and ends in this RLC PDU. The earlier usage of the special length indicator value of 0000000, to indicate that previous SDU ended in the previous PDU and was not indicated, can be replaced with the usage of LI=1111100, i.e., LI=1111100 indicates that new SDU starts and that implicitly means that previous SDU (if any) ended in the previous PDU, and that either was indicated with length indicator or not.

According to a third embodiment of the invention, the meaning of the special length indicator values 0000000 and 1111100 are not changed but instead the reserved length indicator=1111101 is used to indicate that the RLC SDU starts and ends in this RLC PDU. This has the advantage that no changes are needed to the usage of those special length indicators currently in use. The details are shown in the following tables.

Length: 7 bits

| Bit | Description |
|---|---|
| 0000000 | The previous RLC PDU was exactly filled with the last segment of an RLC SDU and there is no "Length Indicator" that indicates the end of the RLC SDU in the previous RLC PDU. |

-continued

Length: 7 bits

| Bit | Description |
| --- | --- |
| 1111100 | UMD PDU: The first data octet in this RLC PDU is the first octet of an RLC SDU. AMD PDU: Reserved (PDUs with this coding will be discarded by this version of the protocol). |
| 1111101 | UMD PDU: The first data octet in this RLC PDU is the first octet of an RLC SDU and the last octet in this RLC PDU is the last octet of an RLC SDU (same or different SDU). AMD PDU: Reserved (PDUs with this coding will be discarded by this version of the protocol). |
| 1111110 | AMD PDU: The rest of the RLC PDU includes a piggybacked STATUS PDU. UMD PDU: The RLC PDU includes a segment of an SDU but neither the first octet nor the last octet of this SDU. |
| 1111111 | The rest of the RLC PDU is padding. The padding length can be zero. |

Length: 15 bits

| Bit | Description |
| --- | --- |
| 000000000000000 | The previous RLC PDU was exactly filled with the last segment of an RLC SDU and there is no "Length Indicator" that indicates the end of the RLC SDU in the previous RLC PDU. |
| 111111111111010 | UMD PDU: The first data octet in this RLC PDU is the first octet of an RLC SDU and the second last octet in this RLC PDU is the last octet of an RLC SDU (same or different SDU). The remaining one octet in the RLC PDU is ignored. |
| 111111111111011 | The last segment of an RLC SDU was one octet short of exactly filling the previous RLC PDU and there is no "Length Indicator" that indicates the end of the RLC SDU in the previous RLC PDU. The remaining one octet in the previous RLC PDU is ignored. |
| 111111111111100 | UMD PDU: The first data octet in this RLC PDU is the first octet of an RLC SDU. AMD PDU: Reserved (PDUs with this coding will be discarded by this version of the protocol). |
| 111111111111101 | UMD PDU: The first data octet in this RLC PDU is the first octet of an RLC SDU and the last octet in this RLC PDU is the last octet of an RLC SDU (same or different SDU). AMD PDU: Reserved (PDUs with this coding will be discarded by this version of the protocol). |
| 111111111111110 | AMD PDU: The rest of the RLC PDU includes a piggybacked STATUS PDU. UMD PDU: The RLC PDU includes a segment of an SDU but neither the first octet nor the last octet of this SDU. |
| 111111111111111 | The rest of the RLC PDU is padding. The padding length can be zero. |

In the above special length indicators, it is said that the last octet of the PDU can be the last octet of the same SDU which starts in the PDU, i.e., one SDU per PDU, or the last octet of a different SDU, i.e., several SDUs per PDU). The former case is shown in most figures (FIG. 1-5), the latter in FIG. 6.

The following figures illustrate various embodiments of the present invention. The figures show the RLC PDUs of size 39 octets with different RLC SDU sizes, except FIG. 6 which shows RLU PDU of size 74 octets. The advantage of the invention is seen with the RLC SDU of size 37 octets, as shown in Col. B where SDU start and end are known based on the RLC PDU header, whereas with the example of Col. A the end is known only after receiving the next RLC PDU. There is no change for RLC SDU of size 38 (FIG. 1 or FIG. 3), for smaller RLC SDU sizes (36, 35, 34, etc.) the only change in the first embodiment is that LI=0000000 is used instead of LI=1111100 (FIG. 2).

The arrows in the figures show how the first and last octet of RLC SDUs are indicated. Solid line illustrates explicit indication, as written in the specification, and dashed line illustrates implicit indication, also according to the specification.

FIG. 1, a first embodiment, illustrates Sequence of RLC UMD PDUs showing the usage of length indicator, RLC PDU size of 39 octets and RLC SDU sizes of 38 or 37 octets. Col. A shown on the left side, illustrates an example that does not implement an embodiment of the current invention and Col. B, shown on the right side, illustrates an example that implements an embodiment of the current invention. The RLC PDU with sequence number (SN) includes RLC SDU of size 38 octets which is indicated with the extension flag (E=0). RLC PDUs with sequence numbers SN+1 and SN+2 include RLC SDU of size 37 octets (i.e., two octets smaller than the RLC PDU size). Col. A (left side) requires special length indicator=0000000 in the next PDU to indicate the end of the RLC SDU, whereas in Col. B, length indicator=1111100 indicates both start and end of the RLC SDU and thus there is no need to wait for the next PDU before delivering the complete SDU to higher layers.

FIG. 2, also the first embodiment, illustrates Sequence of RLC UMD PDUs showing the usage of length indicator, RLC PDU size of 39 octets and RLC SDU sizes of 36, 35 or 34 octets. Col. A shown on the left side, illustrates an example that does not implement an embodiment of the current invention and Col. B, shown on the right side, illustrates an example that implements an embodiment of the current invention. The only change from Col. A is that length indicator=1111100 is changed to length indicator=0000000.

FIG. 3 illustrates sequence of RLC UMD PDUs showing the usage of length indicator, RLC PDU size of 39 octets and RLC SDU sizes of 38 or 37 octets, according to another embodiment of the invention. Col. A shown on the left side, illustrates an example that does not implement an embodiment of the current invention and Col. B, shown on the right side, illustrates an example that implements an embodiment of the current invention. The RLC PDU with sequence number SN includes RLC SDU of size 38 octets which is indicated with the extension flag (E=0). RLC PDUs with sequence numbers SN+1 and SN+2 include RLC SDU of size 37 octets (i.e., two octets smaller than the RLC PDU size). Col. A (left side) requires special length indicator=0000000 in the next PDU to indicate the end of the RLC SDU, whereas in Col. B length indicator=0000000 indicates both start and end of the RLC SDU and thus there is no need to wait for the next PDU before delivering the complete SDU to higher layers.

FIG. 4 illustrates Sequence of RLC UMD PDUs showing the usage of length indicator, RLC PDU size of 39 octets and RLC SDU sizes of 36, 35 or 34 octets. As can be seen there is no change for these smaller SDU sizes in this embodiment.

FIG. 5 illustrates sequence of RLC UMD PDUs showing the usage of length indicator for the last SDU of 37 octets, RLC PDU size of 39 octets. Col. A shown on the left side, illustrates an example that does not implement an embodiment of the current invention and requires one additional RLC PDU including special LI=0000000 to indicate that SDU ended in the previous RLC PDU and padding to fill the RLC PDU. Col. B, shown on the right side, showing an example that implements an embodiment of the current invention, illustrates that no extra RLC PDU is needed—in this case, the an embodiment of the present invention saves in capacity.

FIG. 6 illustrates sequence of RLC UMD PDUs showing the usage of length indicator, RLC PDU size of 74 octets and two RLC SDUs per PDU. Col. A shown on the left side, illustrates an example that does not implement an embodiment of the current invention and Col. B, shown on the right side, illustrates an example that implements an embodiment of the current invention. Here, the special length indicator=0000000 indicates that one SDU starts and another ends in this PDU, whereas Col. A requires the special length indicator=0000000 in the next PDU to indicate that SDU ended exactly in the previous PDU. With the present invention, SDU number sequence numbers can be delivered to higher layers earlier than with the current specification/prior art.

FIG. 7 illustrates sequence of RLC UMD PDUs showing the usage of length indicator, RLC PDU size of 39 octets and a sequence of RLC SDU sizes of 40, 34 and 37 octets. Col. A shown on the left side, illustrates an example that does not implement an embodiment of the current invention and Col. B, shown on the right side, illustrates an example that implements an embodiment of the current invention. The RLC SDU of 40 octets does not fit into RLC PDU of size 39 octets and has to be segmented. Thus, in RLC PDU number SN+1, first octet is not first octet of an SDU and therefore no special length indicator is used to indicate that. Length indicator=0000011 indicates the end of the segmented SDU (three octets). The complete SDU of 34 octets fits into the PDU but it is not possible to indicate the end in this PDU since there is no space for the length indicator. Therefore, length indicator=0000000 is used in the next PDU. This explicitly means that last octet of the previous PDU was the last octet of an SDU. With this invention, length indicator=0000000 or length indicator=1111100 is used, length indicator=0000000 if SDU starts and ends in that PDU and length indicator=1111100 if SDU starts (but last octet is not last octet of SDU), which both implicitly indicate that SDU has ended in the previous PDU. Furthermore, if the RLC SDU of 37 octets happens to be the last SDU in a sequence, the implementation in Col. A still requires an additional RLC PDU which has length indicator=0000000 and padding (not shown in the figure).

FIG. 8 illustrates sequence of RLC UMD PDUs showing the usage of length indicator, RLC PDU size of 39 octets and RLC SDU sizes of 38 or 37 octets, according to third embodiment of the invention. Col. A shown on the left side, illustrates an example that does not implement an embodiment of the current invention and Col. B, shown on the right side, illustrates an example that implements an embodiment of the current invention. The RLC PDU with sequence number SN includes RLC SDU of size 38 octets which is indicated with the extension flag (E=0). RLC PDUs with sequence numbers SN+1 and SN+2 include RLC SDU of size 37 octets (i.e., two octets smaller than the RLC PDU size). Col. A (left side) requires special length indicator=0000000 in the next PDU to indicate the end of the RLC SDU, whereas in Col. B length indicator=1111101 indicates both start and end of the RLC SDU and thus there is no need to wait for the next PDU before delivering the complete SDU to higher layers.

FIG. 9 illustrates Sequence of RLC UMD PDUs showing the usage of length indicator, RLC PDU size of 39 octets and RLC SDU sizes of 36, 35 or 34 octets. As can be seen there is no change for these smaller SDU sizes in this embodiment.

FIG. 10 illustrates sequence of RLC UMD PDUs showing the usage of length indicator for the last SDU of 37 octets, RLC PDU size of 39 octets. Col. A shown on the left side, illustrates an example that does not implement an embodiment of the current invention and requires one additional RLC PDU including special LI=0000000 to indicate that SDU ended in the previous RLC PDU and padding to fill the RLC PDU. Col. B, shown on the right side, showing an example that implements an embodiment of the current invention, illustrates that no extra RLC PDU is needed since LI=1111101 indicates both the start and the end of the SDU—in this case, the an embodiment of the present invention saves in capacity.

FIG. 11 illustrates sequence of RLC UMD PDUs showing the usage of length indicator, RLC PDU size of 74 octets and two RLC SDUs per PDU. Col. A shown on the left side, illustrates an example that does not implement an embodiment of the current invention and Col. B, shown on the right side, illustrates an example that implements an embodiment of the current invention. Here, the special length indicator=1111101 indicates that one SDU starts and another ends in this PDU, whereas Col. A requires the special length indicator=0000000 in the next PDU to indicate that SDU ended exactly in the previous PDU. With the present invention, SDU number SN can be delivered to higher layers earlier than with the current specification/prior art.

FIG. 12 illustrates sequence of RLC UMD PDUs showing the usage of length indicator, RLC PDU size of 39 octets and a sequence of RLC SDU sizes of 40, 34 and 37 octets. Col. A shown on the left side, illustrates an example that does not implement an embodiment of the current invention and Col. B, shown on the right side, illustrates an example that implements an embodiment of the current invention. The RLC SDU of 40 octets does not fit into RLC PDU of size 39 octets and has to be segmented. Thus, in RLC PDU number SN+1, first octet is not first octet of an SDU and therefore no special length indicator is used to indicate that. Length indicator=0000011 indicates the end of the segmented SDU (three octets). The complete SDU of 34 octets fits into the PDU but it is not possible to indicate the end in this PDU since there is no space for the length indicator. Therefore, length indicator=0000000 is used in the next PDU (Col. A). This explicitly means that last octet of the previous PDU was the last octet of an SDU. With the present invention, length indicator=0000000 or length indicator=1111100 or length indicator=1111101 is used in the next PDU (SN+2 in this example), length indicator=1111101 if SDU starts and ends in that PDU, and length indicator=1111100 if SDU starts (but last octet is not last octet of SDU), which both implicitly indicate that SDU has ended in the previous PDU or length indicator=0000000 if no data follows. Furthermore, if the RLC SDU of 37 octets happens to be the last SDU in a sequence, the implementation in Col. A still requires an additional RLC PDU which has length indicator=0000000 and padding (not shown in the figure).

Figure 13:
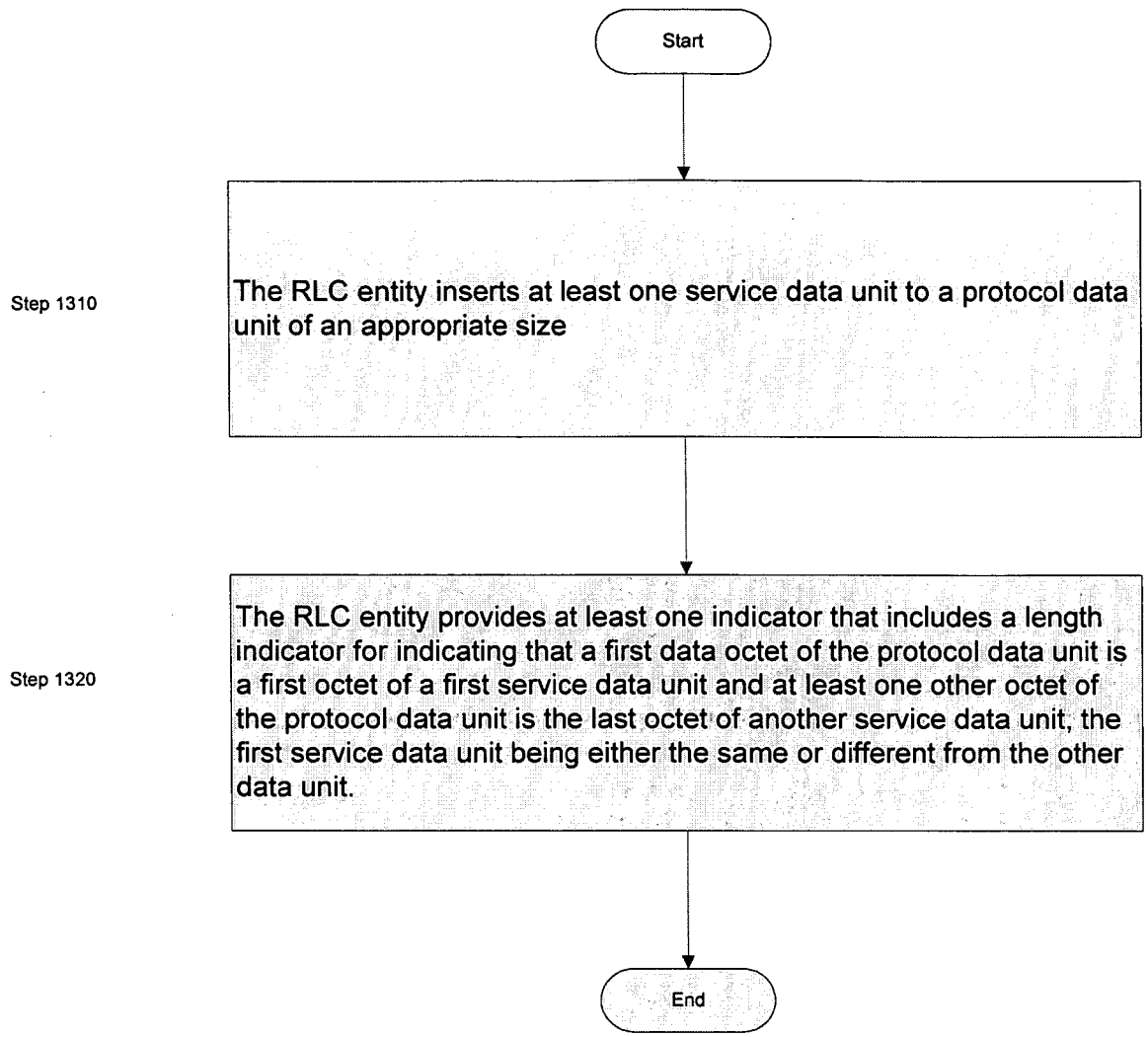
FIG. 13 illustrates the steps implement in an embodiment of the present invention.

FIG. 13 illustrates the steps implement in an embodiment of the present invention. In Step 1310, the RLC entity inserts at least one service data unit to a protocol data unit of an appropriate size. In Step 1320, the RLC entity provides at least one indicator that includes a length indicator for indicating that a first data octet of the protocol data unit is a first octet of a first service data unit and at least one other octet of the protocol data unit is the last octet of another service data unit, the first service data unit being either the same or different from the other data unit.

The RLC entities typically reside in the UE and in the network side in RNC. RLC in the network side could be implemented also in the Node B (base station). The present invention applies to both up and downlink, i.e., the transmitting RLC can be in the UE and the receiving in the network (RNC or base station) or vice versa.

The network should signal (e.g., using RRC signaling) to the user equipment whether new or old interpretation is used. Network knows which user equipments are new user equipments and uses this new feature only for them. New user equipments have to support both interpretations, new network at least the above mentioned signaling. The default should be the old signaling (i.e., if no signaling from network then user equipment should assume old interpretation).

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It should be appreciated by one skilled in art, that the present invention may be utilized in any device that optimizes radio link control (RLC) unacknowledged mode (UM) PDU headers of WCDMA for VoIMS, i.e., to better support PS voice transmissions WCDMA air interface. As noted above, while the present application describes the invention as being implemented in a WCDMA type of system, the present invention may be implemented in other systems, such as in 3.9 G systems. The foregoing description has been directed to specific embodiments of this invention. It will be apparent; however, that other variations and modifications may be made to the described embodiments, with the attainment of some or all of their advantages. Therefore, it is the object of the appended claims to cover all such variations and modifications as come within the true spirit and scope of the invention.

The invention claimed is:

1. A method comprising:
   inserting, by a radio link control entity, at least one service data unit to a protocol data unit of an appropriate size; and
   providing at least one indicator including a length indicator to indicate that a first data octet of the protocol data unit is a first octet of a first service data unit and at least one other octet of the protocol data unit is the last octet of another service data unit, the first service data unit being either the same or different from the other service data unit, wherein the length indicator indicates that the protocol data unit comprises one or more completed service data units, wherein the method is performed in an apparatus.

2. The method of claim 1, wherein the at least one other octet is the last octet of the protocol data unit.

3. The method of claim 1, wherein the at least one other octet is the second last octet of the protocol data unit.

4. The method of claim 1, wherein the radio link control entity is an unacknowledged mode entity.

5. The method of claim 1, wherein providing at least one indicator further comprises providing the length indicator of at least one of 7 or 15 bits.

6. The method of claim 1, wherein providing at least one indicator further comprises providing the length indicator with a value of "0000000" to indicate that the first data octet of the protocol data unit is the first octet of a first service data unit and the last octet of the protocol data unit is the last octet of the other service data unit, the first service data unit being either the same or different from the other service data unit.

7. The method of claim 1, wherein providing at least one indicator further comprises providing the length indicator with a value of "1111100" to indicate that the first data octet of the protocol data unit is the first octet of a first service data unit and the last octet of the protocol data unit is the last octet of another service data unit, the first service data unit being either the same or different from the other service data unit.

8. The method of claim 1, wherein providing at least one indicator further comprises providing the length indicator with a value of "1111101" to indicate that the first data octet in a current protocol data unit is the first octet of the first service data unit and the last octet in the current protocol data unit is the last octet of the first service data unit.

9. The method of claim 8, wherein providing the length indicator with a value of "1111101" further comprises indicating that the first service data unit is two octets smaller than the current protocol data unit.

10. The method of claim 1, wherein providing at least one indicator further comprises providing the length indicator with a value of "1111101" to indicate that the first data octet in a current protocol data unit is the first octet of the first service data unit and the last octet in the current protocol data unit is the last octet of the other service data unit, the first service data unit being either the same or different from the other service data unit.

11. The method of claim 1, wherein providing at least one indicator further comprises providing the length indicator with a value of "111 1111 1111 1101" to indicate that the first data octet in a current protocol data unit is the first octet of the first service data unit and the last octet in the current protocol data unit is the last octet of the first service data unit.

12. The method of claim 11, wherein providing the length indicator with a value of "111 1111 1111 1101" further comprises indicating that the first service data unit is three or four octets smaller than the current protocol data unit.

13. The method of claim 1, wherein providing at least one indicator further comprises providing the length indicator with a value of "111 1111 1111 1010" to indicate that the first data octet in a current protocol data unit is the first octet of the first service data unit and that a second last octet of the current protocol data unit is the last octet of the first service data unit.

14. The method of claim 13, wherein providing the length indicator with a value of "111 1111 1111 1010" further comprises indicating that the first service data unit is three or four octets smaller than the current protocol data unit.

15. The method of claim 1, further comprising providing a higher layer signalling to a user equipment to identify whether or not the length indicator is used.

16. An apparatus comprising:
    an inserting unit configured to insert, in a radio link control entity, at least one service data unit to a protocol data unit of an appropriate size; and a providing unit configured to provide at least one indicator including a length indicator configured to indicate that a first data octet of the protocol data unit is a first octet of a first service data unit and at least one other octet of the protocol data unit is the last octet of another service data unit, the first service data unit being either the same or different from the other service data unit, wherein the length indicator indicates that the protocol data unit comprises one or more completed service data units, wherein the apparatus is implemented at least partly in hardware.

17. The apparatus of claim 16, wherein the at least one other octet is the last octet of the protocol data unit.

18. The apparatus of claim 16, wherein the at least one other octet is the second last octet of the protocol data unit.

19. The apparatus of claim 16, wherein the radio link control entity is an unacknowledged mode entity.

20. The apparatus of claim 16, wherein the providing unit is configured to provide at least one indicator further comprises providing the length indicator of at least one of 7 or 15 bits.

21. The apparatus of claim 16, wherein the providing unit is configured to provide the length indicator with a value of "0000000" to indicate that the first data octet of the protocol data unit is the first octet of the first service data unit and the last octet of the protocol data unit is the last octet of another service data unit, the first service data unit being either the same or different from the other service data unit.

22. The apparatus of claim 16, wherein the providing unit is configured to provide the length indicator with a value of "1111100" to indicate that the first data octet of the protocol data unit is the first octet of the first service data unit and the last octet of the protocol data unit is the last octet of another service data unit, the first service data unit being either the same or different from the other service data unit.

23. The apparatus of claim 16, wherein the providing unit is configured to provide the length indicator with a value of "1111101" to indicate that the first data octet in a current protocol data unit is the first octet of the first service data unit and the last octet in the current protocol data unit is the last octet of the first service data unit.

24. The apparatus of claim 23, wherein the providing unit is configured to provide the length indicator with a value of "1111101" to indicate that the first service data unit is two octets smaller than the current protocol data unit.

25. The apparatus of claim 16, wherein the providing unit is configured to provide the length indicator with a value of "1111101" to indicate that the first data octet in a current protocol data unit is the first octet of the first service data unit and the last octet in the current protocol data unit is the last octet of another service data unit, the first service data unit being either the same or different from the other service data unit.

26. The apparatus of claim 16, wherein the providing unit is configured to provide the length indicator with a value of "111 1111 1111 1101" to indicate that the first data octet in a current protocol data unit is the first octet of the first service data unit and the last octet in the current protocol data unit is the last octet of the first service data unit.

27. The apparatus of claim 26, wherein the providing unit is configured to provide the length indicator with a value of "111 1111 1111 1101" to indicate that the first service data unit is three or four octets smaller than the current protocol data unit.

28. The apparatus of claim 16, wherein the providing unit is configured to provide the length indicator with a value of "111 1111 1111 1010" to indicate that the first data octet in a current protocol data unit is the first octet of the first service data unit and that a second last octet of the current protocol data unit is the last octet of the first service data unit.

29. The apparatus of claim 28, wherein the providing unit is configured to provide the length indicator with a value of "111 1111 1111 1010" to indicate that the first service data unit is three or four octets smaller than the current protocol data unit.

30. An apparatus comprising:
inserting means for inserting in a radio link control entity, at least one service data unit to a protocol data unit of an appropriate size; and
providing means for providing at least one indicator including a length indicator for indicating that a first data octet of the protocol data unit is a first octet of a first service data unit and at least one other octet of the protocol data unit is the last octet of another service data unit, the first service data unit being either the same or different from the other service data unit, wherein the length indicator indicates that the protocol data unit comprises one or more completed service data units, wherein the apparatus is implemented at least partly in hardware.

31. A computer program product embodied on a computer readable medium, the computer program product comprising code portions for:
inserting, in a radio link control entity, at least one service data unit to a protocol data unit of an appropriate size; and
providing at least one indicator including a length indicator to indicate that a first data octet of the protocol data unit is a first octet of a first service data unit and at least one other octet of the protocol data unit is the last octet of another service data unit, the first service data unit being either the same or different from the other service data unit, wherein the length indicator indicates that the protocol data unit comprises one or more completed service data units.

* * * * *